Patented Feb. 26, 1952

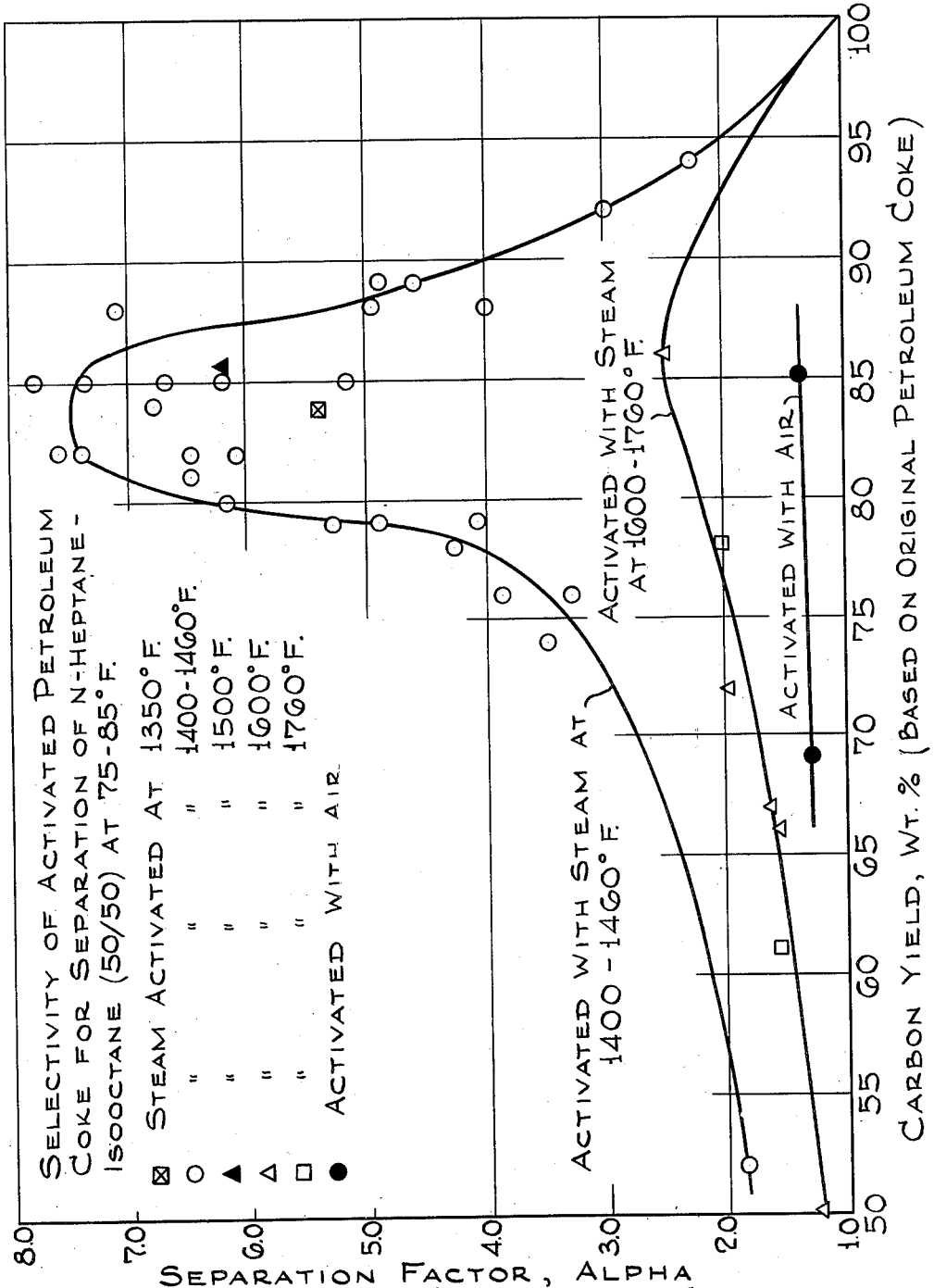

2,586,889

UNITED STATES PATENT OFFICE 2,586,889

SEPARATION OF STRAIGHT-CHAIN FROM BRANCHED-CHAIN HYDROCARBONS

Hans G. Vesterdal and William A. Konrad, Elizabeth, N. J., assignors to Standard Oil Development Company, a corporation of Delaware Application August 23, 1949, Serial No. 111,946

18 Claims. (Cl. 196—148)

This invention relates to an improved selective adsorbent for the separation of normally liquid straight-chain hydrocarbons from branched-chain and cyclic hydrocarbons. More specifically the invention is concerned with an improved adsorbent prepared from petroleum coke by treating the petroleum coke with steam at a temperature of 1350°–1500° F. preferably 1400°–1460° F. until a yield of coke of about 70-90% is obtained.

It is well known in the art that an activated carbon useful in hydrocarbon separations may be made by steaming carbon from various sources particularly wood charcoal and charcoal made from coconut shells at about 1500° F. to 2000° F. Activated carbons made in this manner have some selectivity for the separation of straight-chain hydrocarbons from branched-chain hydrocarbons but the selectivity is too low (alpha=1.3 to 2.0) for commercial application of such separation processes.

It has now been found that activated carbons having much higher selectivity for the separation of normally liquid straight-chain from branched-chain and cyclic hydrocarbons may be made from petroleum cokes, particularly cokes produced from petroleum acid sludges, by steaming the petroleum cokes at a temperature in the range of 1350°–1500° F., preferably 1400° F. to 1460° F. to a yield of 70-90 weight per cent of the original coke, preferably 75–88 weight per cent.

Petroleum cokes are produced in numerous petroleum refining operations such as cracking, reforming, vis-breaking, etc., and from sludges resulting from the treatment of petroleum distillates with strong sulfuric acid and/or SO₃. This invention is particularly concerned with petroleum cokes recovered from petroleum acid sludges.

Acid sludges are produced as a result of various petroleum refining operations particularly the sulfuric acid treatment of gasoline, lubricating oils and higher-boiling petroleum distillates particularly phenol extracted oils from which the so-called white oils are prepared by treatment with fuming sulfuric acid or SO₃. The resulting acid layers from the above treating operations vary in character depending upon the severity of the acid treatment but in general consist of a carbonaceous residue admixed with unreacted sulfuric acid, sulfonic acids, sulfur derivatives and water from which a tarry residue called a sludge is obtained upon the settling of the acid layer.

The activated petroleum coke which is employed in this invention is prepared as follows: The tarry sludge is introduced into a decomposition zone. In the decomposition zone the sludge is carbonized by contacting it in the absence of air with a mass of hot coke maintained with continuous stirring at a temperature of 400° F. to about 750° F., preferably about 600° F. to 700° F. for a period of time sufficient to distill therefrom the bulk of the volatile matter present in the sludge. The carbonized sludge is then transferred to a kiln where it is partially burned with air at a temperature of 650° F. to 1200° F., preferably 1000°–1200° F. for a period of time depending upon the type of coke desired, generally 5 to 25 minutes. The bulk of the resulting hot coke is recycled to the decomposition zone to maintain the mass of coke therein and to supply the necessary heat for the carbonization, the balance of the coke is removed as the desired product which is cooled and comminuted to desired size. About seven lbs. of hot coke is recycled to the decomposition zone for each one lb. of coke removed as product which is known as petroleum coke.

The steaming of the carbon is preferably carried out in a reactor in which steam is passed upwardly through a fluidized bed of the comminuted carbon at such a rate that the bed is kept in continuous fluid state resembling a boiling liquid. However, a fixed bed reactor is also suitable. Steaming time and rate may be varied between wide limits to the desired coke yield. By steaming a coke recovered from a petroleum acid sludge at approximately 1430° F. for 40 minutes in a 1.85" I. D. KA₂S reactor, using a steam rate of about 2.4 lbs. steam/lb. carbon/hour and a superficial steam velocity of about 1.1 ft./sec., a carbon yield of 81.8 weight per cent was obtained. This carbon has a separation factor (alpha) of 7.6 and a capacity of about 29 cc./100 g. when used for the separation of n-heptane from a mixture with isooctane at 70° F.

Experimental data demonstrate that the capacity of the carbon for normally liquid hydrocarbons is a linear function of the yield of carbon regardless of preparation conditions. The capacity increased from 7 cc./100 g. at 100% yield to about 75 cc./100 g. at 50% yield of carbon. The selectivity (alpha) on the other hand is critically dependent on preparation conditions, and high selectivities for liquid phase hydrocarbon separations are obtained only when steaming the coke until a yield of about 70 to 90 weight per cent, preferably 75 to 88 weight per cent has been obtained. For hydrocarbons boiling in the naphtha range high selectivities are only obtained when steaming petroleum coke at temperatures below 1600° F., preferably about 1350–1500° F. and more preferably about 1430° F.–1445° F. If the coke is steamed to yields below about 70 weight per cent selectivity for the separation of liquid hydrocarbons is sharply decreased.

Steam rate data indicate that when using a steam rate of 1.1 wt. steam/wt. coke/hour the optimum steaming time at 1430° F. is about 40-70 minutes. However, even more selective carbons may be made using higher steam rates (1.7-4.9 w./w./hr.) and steaming for a time sufficient to bring the yield level down to optimum range 75-90%.

The drawing represents a plot of selectivities versus carbon yields obtained by steaming a coke prepared from petroleum sulfuric acid sludge. The data show the activities of the various carbons as represented by the selectivity when the carbons are treated with steam at temperatures between 1350° and 1760° F. For comparison purposes some data are also included on carbons activated with air. The plot shows that very selective carbons are produced when the petroleum coke is steamed at temperatures in the range of 1350-1500° F., particularly 1400-1460° F. and when the coke is steamed to yields of 75 to about 90 weight per cent. Selectivities (alpha) of 4.0 to 8.0 are common with carbons obtained by steam activating petroleum coke at temperatures of 1350-1500° F., preferably 1400-1460° F. to yields of 75 to 90 weight per cent; whereas steaming at higher temperatures such as 1600-1760° F. produces very low alphas of the order of 1.5 to 2.5. Similarly very low alphas are obtained when activating with air.

The separation factors or selectivities as represented by alpha were determined by data obtained from the liquid phase separation of a 50-50 volume per cent mixture of normal heptane and isooctane at atmospheric pressure and at temperatures in the vicinity of 75-85° F.

EXAMPLE I

The data in Table I demonstrate the effectiveness of a steam-activated petroleum coke (from acid sludge) in separating n-heptane from isooctane (50/50 mixture) in the liquid phase when the coke is steam activated at various temperatures to yields of 78-86 weight per cent. When the coke was steam activated at 1430° F. employing 2.4 lbs. steam/lb. coke/hour for 40 minutes to a yield of 82% a capacity of 29 cc./g. was obtained with a selectivity of 7.6 in favor of n-heptane. When steamed for 20 minutes at 1500° F. to an 86% yield, a capacity of 25 cc./g. and selectivity of 6.2 was obtained. Steaming at 1600° F. and 1760° F. respectively for 20 minutes produced carbons having capacities of 20 cc./g. and 27 cc./g. respectively, but the selectivity factors dropped to 2.5 and 2.0 respectively. The most selective commercially available adsorbent carbon, known as Columbia "G" carbon and made from cocoanut shells, displayed a capacity of 53 cc./g. and a selectivity of 2.1 in the n-heptane-isooctane system. All runs were made in the liquid phase at 75-85° F. and at atmospheric pressure.

Table I

EFFECT OF TEMPERATURE ON SELECTIVITY WHEN STEAM-ACTIVATING PETROLEUM COKE TO THE OPTIMUM YIELD RANGE (75-90%)

|  | Untreated Pet. Coke | Steam Activated Pet. Coke | | | | | Col. "G" Carbon |
|---|---|---|---|---|---|---|---|
| Activation Temperature, °F |  | 1,350 | 1,430 | 1,500 | 1,600 | 1,760 |  |
| Activation Time, minutes |  | 210 | 40 | 20 | 20 | 20 |  |
| Steam Rate, w./w./hr |  | 1.5 | 2.4 | 3.9 | 1.1 |  |  |
| Carbon Yield, weight percent | 100 | 84 | 82 | 86 | 86 | 78 |  |
| N-Heptane-Isooctane (50/50) Adsorption at 75-85° F.: |  |  |  |  |  |  |  |
| Capacity, cc./100 g | 7 | 24 | 29 | 25 | 20 | 27 | 53 |
| Separation Factor, Alpha | 1.0 | 5.4 | 7.6 | 6.2 | 2.5 | 2.0 | 2.1 |

EXAMPLE II

The data in Table II demonstrate the effectiveness of a steam-activated petroleum coke (from acid sludge) in separating n-heptane from isooctane (50/50 mixture) in the liquid phase when the coke is steam activated at 1410° F. to 1435° F. to yields ranging from 52 to 92%. When the coke was activated at 1430° and 1435° F. to yields of 82 and 84% respectively, capacities of 29 and 26 cc./100 g. and selectivities of 7.6 and 6.8 were obtained respectively. When steaming to lower carbon yields (74 and 52%) the capacity of the carbon increases while the selectivity decreases to a low level. If the steaming is discontinued after reaching a yield level of 92% the carbon is undertreated and has a low capacity, 15 cc./100 g. and a relatively low selectivity.

Table II

EFFECT OF CARBON YIELD ON SELECTIVITY WHEN STEAM-ACTIVATING PETROLEUM COKE IN THE OPTIMUM TEMPERATURE RANGE, 1400-1460° F.

| Activation Temp., °F | 1,430 | 1,430 | 1,430 | 1,435 | 1,410 |
|---|---|---|---|---|---|
| Activation Time, Mins | 120 | 60 | 40 | 60 | 40 |
| Steam Rate, w./w./hr | 3.9 | 2.3 | 2.4 | 1.3 | 2.0 |
| Unaerated Carbon Bed Depth, Inches | 5.6 | 5.6 | 8.0 | 17.0 | 7.3 |
| Carbon Yield | 52 | 74 | 82 | 84 | 92 |
| N-Heptane-Isooctane Adsorption at 75-85° F.: |  |  |  |  |  |
| Capacity, cc./100 g | 77 | 42 | 29 | 26 | 15 |
| Separation Factor, Alpha | 1.9 | 3.5 | 7.6 | 6.8 | 3.0 |

EXAMPLE III

A composite sample of petroleum coke activated with 2.2-2.5 wt. steam/wt. coke/hour for 40 minutes at a temperature of 1400-1460° F. to a yield of 75-88 weight per cent was employed in the separation of n-hexane from a complex mixture of hydrocarbons. The separation was made in the liquid phase under atmospheric temperature and pressure conditions. The mixture was treated with 6 lbs. of coke/gal. of feed by percolation through a column of carbon. Analyses of the feed, of various filtrate fractions, and of the adsorbate indicate the effectiveness of the coke for the separation of low octane number n- hexane from the feed, as shown by the data in Table III.

*Table III*

| Filtrate, Volume Percent of Charge | Composition, Volume Percent | | | | Research Octane Number |
|---|---|---|---|---|---|
| | N-Hexane | 3 Me-Pentane | Cyclo-Hexane | Me-Cyclo-Pentane | |
| 0-9 | 3 | 36 | 32 | 29 | 81 |
| 0-27 | 11 | 35 | 26 | 27 | 76 |
| 27-76 | 20 | 32 | 22 | 27 | 71 |
| Adsorbate, (24%) | 52 | 39 | 9 | 0 | 49 |
| Original Feed | 25 | 35 | 20 | 20 | 66 |

EXAMPLE IV

On contacting a 50/50 mixture (by vol.) of hexene-1 and 2-ethyl-1-butene with 0.654 gm. activated petroleum coke per 1 cc. of the hydrocarbon mixture (5.45 lbs./gal.) at room temperature (80° F.) the concentration of hexene-1 in the supernatant liquid decreased from 50% to 43.5% due to selective adsorption of this straight chain olefin. As a consequence the concentration of hexene-1 in the adsorbate was 78.2%.

| Carbon Treat 5.45 lbs./gal. | Feed | Supernatant Liquid | Adsorbate |
|---|---|---|---|
| Concentration of Hexene-1 | 50.0 | 43.5 | 78.2 |
| Concentration of 2-Ethyl-1-Butene | 50.0 | 56.5 | 21.8 |

The capacity of the carbon was 28.6 cc./100 g. (0.034 gal./lb.) and the selectivity (separation factor, alpha) was 4.66. It has been calculated that in order to separate a 50/50 mixture of hexene-1 and 2-ethyl-1-butene into 95% pure products a minimum of only 3.8 stages and a minimum adsorbent rate of 23 lbs./gal. would be required. Such a separation process is important for the preparation of olefinic feed stocks for the oxo-process, for synthetic lube oil, synthetic rubber processes, etc.

The invention finds particular applicability in the liquid phase upgrading of low octane naphthas. By contacting a low octane naphtha with the particular activated carbon of this invention the amount of straight chain or low octane hydrocarbons present in the naphtha is diminished due to adsorption by the carbon thereby imparting a higher overall octane rating to the unadsorbed naphtha. The process finds application not only in the treatment of naphtha to improve octane number, and in the segregation of pure hydrocarbons such as n-pentane, hexane, etc., but in the improvement of higher boiling hydrocarbons such as diesel fuels and lubricating oil stocks.

The carbon produced according to this invention can be employed in adsorption processes conducted over a wide range of temperatures and pressures for the separation of normally liquid straight chain compounds from branched chain compounds. Either liquid phase or gas phase may be employed at temperatures ranging from about —40° F. to about +300° F., and at pressures varying from atmospheric or lower up to about 1000 p. s. i. g. The carbon may be employed in fixed bed, fluid bed, or moving bed adsorption systems. The liquid or gaseous mixture of straight chain and branched chain compounds may be treated for removal of the straight chain compounds by passing through a fixed bed of carbon or by using concurrent or preferably countercurrent flow of carbon and the mixture to be treated.

In all instances the adsorbed material is recovered from the adsorbent by conventional desorption means, e. g., steaming or stripping with an inert gas, or heating in vacuum, or by treatment with a suitable wash liquid.

Having described the invention what is claimed is:

1. Process for the preparation of an activated carbon from acid sludge coke which comprises treating acid sludge coke with steam at a temperature of 1350° F. to 1500° F. until a yield of 70-90 weight per cent of activated carbon based on the weight of acid sludge coke is obtained.

2. Process according to claim 1 in which the acid sludge coke is treated with steam at a temperature of 1400° F.–1460° F. to a yield of 75-88 weight per cent.

3. Process according to claim 1 in which the acid sludge coke is steamed at a rate of 1.1 to 4.9 wt. steam/wt. coke/hour.

4. Process for the separation of a normally liquid straight-chain hydrocarbon from a mixture thereof with at least one hydrocarbon selected from the group consisting of normally liquid branched-chain aliphatic hydrocarbons and cyclic hydrocarbons which comprises contacting said mixture with an activated carbon prepared by treating acid sludge coke with steam at a temperature of 1350–1500° F. until a yield of 70-90 weight per cent of activated carbon based on the weight of acid sludge coke is obtained whereby the straight-chain hydrocarbon is preferentially adsorbed on the activated carbon.

5. A process according to claim 4 in which the hydrocarbons are contacted in the liquid phase.

6. A process according to claim 4 in which the hydrocarbons boil in the naphtha range.

7. Process according to claim 4 in which the hydrocarbon mixture is contacted with the activated carbon under atmospheric temperature and pressure conditions.

8. Process according to claim 4 in which the activated carbon is obtained by treating acid sludge coke with steam at a temperature of 1400–1460° F. until a yield of 75-88 weight per cent is obtained.

9. Process for the separation of n-heptane from a mixture of normally liquid hydrocarbons which comprises contacting the mixture in the liquid phase under atmospheric temperature and pressure with an activated carbon obtained by steaming acid sludge coke at a temperature of 1350–1500° F. to a yield of 70-90 weight per cent of activated carbon based on the weight of the coke whereby the n-heptane is preferentially adsorbed on the activated carbon.

10. Process according to claim 9 in which the activated carbon is obtained by steaming the acid sludge coke at temperatures of 1400–1460° F. to a yield of 75–88 weight per cent.

11. Process for increasing the octane number of low-octane naphtha containing normal paraffin hydrocarbons which comprises contacting the naphtha with an activated carbon obtained by steaming acid sludge coke at a temperature of 1350–1500° F. to a yield of 70–90 weight per cent of activated carbon based on the weight of the coke whereby the normal paraffin hydrocarbons are preferentially adsorbed on the activated carbon.

12. Process according to claim 11 in which the activated carbon is obtained by steaming the acid sludge coke at temperatures of 1400–1460° F. to a yield of 75–88 weight per cent.

13. Process for the separation of n-hexane from a mixture thereof with normally liquid branched-chain and cyclic hydrocarbons which comprises contacting said mixture with an activated carbon obtained by steaming acid sludge coke at a temperature of 1350–1500° F. to a yield of 70–90 weight per cent of activated carbon based on the weight of the coke whereby the n-hexane is preferentially adsorbed on the activated carbon.

14. Process according to claim 13 in which the activated carbon is obtained by steaming the acid sludge coke at temperature of 1400–1460° F. to a yield of 75–88 weight per cent.

15. Process for the separation of normally liquid straight-chain olefins from a mixture comprising straight-chain and branched-chain olefins which comprises contacting said mixture with an activated carbon prepared by treating acid sludge coke with steam at a temperature of 1350°–1500° F. until a yield of 70–90 weight per cent of activated carbon based on the weight of acid sludge coke is obtained whereby the straight-chain olefin is adsorbed on the activated carbon.

16. Process according to claim 15 in which hexene-1 is separated from a mixture comprising hexene-1 and 2-ethyl-1-butene.

17. A process according to claim 4 in which the hydrocarbons are contacted in the vapor phase.

18. An activated carbon prepared by passing steam through acid sludge coke at a temperature of 1350° F. to 1500° F. until a yield of 70 to 90 weight per cent of activated carbon based on the weight of the acid sludge coke is obtained.

HANS G. VESTERDAL.
WILLIAM A. KONRAD.

REFERENCES CITED

The following references are of record in the file of this patent:

UNITED STATES PATENTS

| Number | Name | Date |
|---|---|---|
| 1,588,405 | Gephart | June 15, 1926 |
| 1,678,299 | Miller | July 24, 1928 |
| 2,393,214 | Andrews | Jan. 15, 1946 |
| 2,405,206 | Gass et al. | Aug. 6, 1946 |
| 2,425,535 | Hibshman | Aug. 12, 1947 |
| 2,470,339 | Claussen et al. | May 17, 1949 |